April 12, 1966    E. W. SHAW    3,245,195
METHOD OF PRODUCING HEAT INSULATING PANELS
Original Filed Feb. 16, 1959
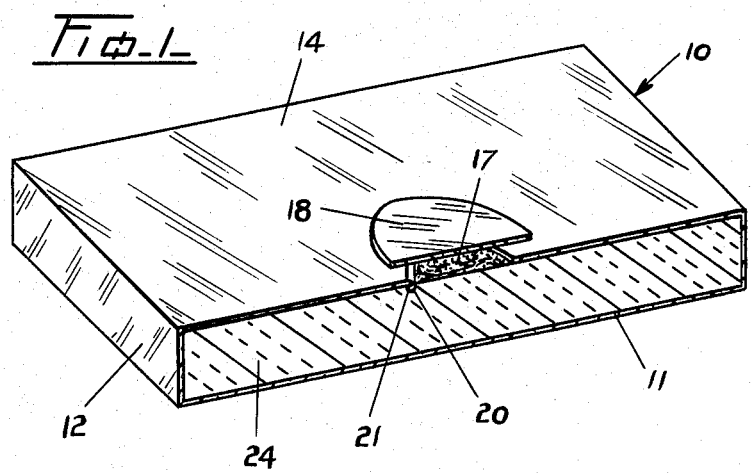
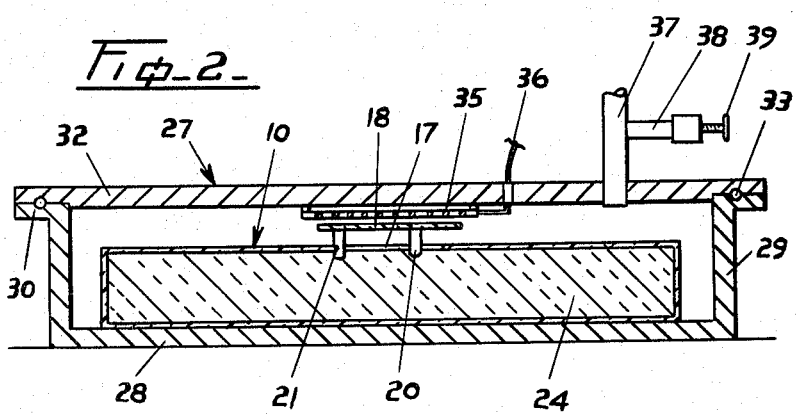
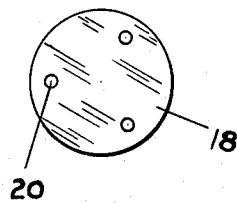
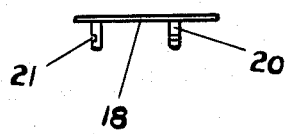
INVENTOR
EDWARD WHARTON SHAW
Ernest E Carver
Agent United States Patent Office 3,245,195
Patented Apr. 12, 1966

3,245,195
METHOD OF PRODUCING HEAT INSULATING PANELS
Edward Wharton Shaw, Gibsons, British Columbia, Canada, assignor to Evacuated Insulation Research Ltd., Gibsons, British Columbia, Canada
Original application Feb. 16, 1959, Ser. No. 793,385, now Patent No. 3,156,975, dated Nov. 17, 1964. Divided and this application June 15, 1964, Ser. No. 374,971
1 Claim. (Cl. 53—22)

My invention relates to improvements in heat insulating panels and methods of producing same. This application is a division of my United States Patent No. 3,156,975, issued November 17, 1964.

This invention contemplates improvements in heat insulation of the evacuated type. The conventional method of impeding the transfer of heat across a temperature gradient is to interpose some form of porous material. Such a material will consist of a solid and a gas phase. Normally the gas will be air and it has long been established that the transfer of heat through still air is less than that through any solid material under like conditions. However, owing to the expansion of air when heated, convection currents are set up and air moving across a temperature gradient will transfer many times more heat than still air. In order to prevent these convection currents, it is common practice to introduce any of a great variety of porous materials, having sealed or connecting air spaces of minute dimensions so that the movement of air is impeded by the molecules constantly coming in contact with the widely dispersed surfaces of said material. Such materials are generally of low apparent density and their effectiveness in preventing the transfer of heat is dependent on the average separation of the elements of their structure. Thus the finer materials are the most efficient.

Thus in any insulated space where a temperature gradient is present, part of the heat will be transferred by conduction through the solid phase and part through the gas phase. While the relative amounts of heat so transferred are not precisely known and will vary with different insulating materials, it is well established that the greater portion is transmitted by the gas phase. It follows therefore that if it is desired to improve the efficiency of such insulation the most obvious step will be to remove the gas phase. However, as has been shown, the solid phase would not then be required since its sole purpose is to impede the movement of air.

Thus the most efficient form of insulation at present in use is provided by the well known Dewar flask which consists of two glass vessels, one set within the other, with a highly evacuated space between. The connection between the vessels is only at the narrow neck where they join, so that heat transfer through the glass is reduced to a minimum.

When an attempt is made to produce a form of heat insulation in which the air is removed two very serious practical difficulties are encountered. First an evacuated space must of necessity be surrounded by an envelope impervious to air, and second this envelope will be subject to atmospheric pressure amounting to about 14.7 p.s.i. (pounds per square inch). Dewar overcame these difficulties by making the envelope of glass and in the form of a vessel, cylindrical in shape and of such size that said vessel would withstand atmospheric pressure. The pressure factor has always limited evacuated structures to a cylindrical shape and has restricted size. Until very recently vessels of about two gallons capacity were the largest made. During the last few years the urgent need of the armed forces for means of storing and transporting liquid gases such as oxygen, hydrogen and helium has resulted in the development of large metal Dewar type devices up to 6000 litres capacity. These, however, are still restricted to the cylindrical shape and are extremely expensive since the structure of large area must be capable of supporting atmospheric pressure.

The Dewar flask was a notable breakthrough in the art of heat insulation, but further developments have been lacking and the original invention, the Dewar flask, is still available only for the storage of liquids. Evacuated insulation is not available for independent use in covering large flat or irregularly shaped surfaces. It is the purpose of this invention to show how evacuated heat insulating panels of varying shapes, sizes and thicknesses may be constructed in a simple manner and at low cost. In practice it is frequently desirable to insulate flat surfaces of considerable area, such as the floor, roof and walls of refrigerated trucks and trailers or railroad box cars, or the walls of buildings and cold storage warehouses. In such case this may be done conveniently by covering said walls with a multiplicity of evacuated insulating panels of rectangular shape and one or more sizes, and of such thickness as may be required to obtain the desired degree of insulation. I therefore describe in detail the construction of such a rectangular panel, though it will be understood that the same method may be used to produce panels of different or irregular shapes.

The first consideration is the envelope and it is clear from the foregoing that this will be subject at all times to atmospheric pressure. Rigidity in the final product is therefore indispensable and, in addition, the size and shape must conform to close tolerances in order that these panels may be readily adapted to their intended use. There are two methods which may be used to construct the envelope; the envelope may be given sufficient strength to enable it to withstand the pressure load, or it may be supported internally by the filler. The first of these alternatives has always been used in the construction of the Dewar flask and it is this choice which has strictly limited design possibilities. Consider for example the case of a panel 20" square and 3" thick such as might well be used in insulating the flat surfaces mentioned. The area would be 400" square and the pressure load would be about 5880 pounds. A structure of this nature without internal supports is clearly impractical. There have been a great number of attempts to construct flat evacuated panels having the envelope supported by internal members but these members being themselves heat conductors have always reduced the gains from the vacuum to an extent which has rendered the design economically valueless. All such designs have been extremely expensive to manufacture and have been found to have little if any insulating advantage as compared with standard and much less costly materials.

Most conventional types of heat insulation are extremely flimsy and may readily be compressed. In use it is always desirable to avoid this compression because the proportion of the solid phase is thereby increased and the heat transfer correspondingly is greater. Examples of this class of materials are rockwool, glasswool, kapoc, Palco wool and many others. There is, however, another class of porous materials, mostly of a somewhat higher apparent density, which may be subjected to pressure without appreciable loss of volume and without increase of conductivity. Examples of these are, silica aerogel, perlite, diatomaceous earth which are in powder form, and pumice, and also charcoal which is a porous solid. It has been shown that all of these materials may be subjected to a pressure of 15 p.s.i. in vacuum and that under these conditions the heat conductivity is very low. As an example it has been shown that silica aerogel in a plastic envelope and evacuated to a pressure of .001 mm. Hg has a conductivity of .04 B.t.u. hr./sq. ft./in./° F.

The corresponding value for conventional porous insulation is from .25 to .30. That is to say that porous materials capable of supporting a pressure of 15 p.s.i. and maintained in a vacuum will have a resistance to the transfer of heat upwards of six times that of insulation now in common use.

In my invention therefore, I use one of these porous materials to support the envelope internally, which material is characterized by its ability to support a pressure of 15 p.s.i. without appreciable loss in volume and which may be in powder or rigid form, natural or manufactured. The envelope is used only as a means of containing this filler and of excluding the air and has no insulating value in itself. The actual thickness of the material which may be used in constructing the envelope has been found to be within the range of .002" to .020". Since the envelope is constructed of these very thin materials, it is obvious that it cannot support any appreciable pressure in any direction and therefore must always rest in completely supported and intimate relationship with the filler.

As has been shown, the normal function of porous material in heat insulation is to prevent air movement. According to my invention however, the main object of the porous filler is to support the envelope and thus make it possible to construct said envelope of thin, light and inexpensive material.

The porous material herein referred to may be defined as one in which the cells making up the material are for the most part open and interconnected so as to permit the free passage of a gas therethrough. The material itself may be in powder form but I prefer to employ a compacted, preformed slab from which the air can be later evacuated.

It will be understood that there is a wide variety of metals and materials from which the envelope for the porous material may be made, but all must be impervious to the flow of air and while I prefer to use glass, stainless steel or ceramics are quite practical.

The invention is shown in the accompanying drawings in which:

FIGURE 1 is a sectional perspective view of a typical insulating panel with the central opening being shown open and unsealed.

FIGURE 2 is an enlarged section of a processing chamber or jig set to close down and seal the several parts of the panel.

FIGURE 3 is an elevation of the top closure.

FIGURE 4 is a plan view, looking up, of the top closure.

In the drawings like characters of reference indicate corresponding parts in each figure.

The numeral 10 indicates generally a rectangular envelope of glass or ceramics which is molded to provide a bottom plate or wall 11, side walls 12 and a top plate or wall 14 all of said parts being integral with one another. A central opening 17 is formed in the top plate 14 and a glass closure 18 is provided for said opening assuming the envelope 10 is also of glass. The closure 18 is shown supported in spaced relation to the top plate by legs 20 also of glass. Each leg 20 is provided with a slot 21 on its inner side to engage the perimeter of the top opening and initially support the closure in this spaced position.

Enclosed within the envelope 10 is a filler 24 of a suitable porous material such as perlite or silica aerogel. This filler material is in powder form and is poured into the envelope through the opening 17 before the closure is fitted. The envelope is then vibrated and rotated to pack the powder material as tightly as possible and completely fill the envelope.

The above described envelope and filler are adapted to be formed into an insulating panel in a single operation during which the envelope is both evacuated and sealed. This operation is carried out in a processing jig 27, see FIG. 2.

The jig 27 consists of a box-like chamber having a bottom wall 28 and side walls 29 provided with top flanges 30. A cover 32 is adapted to be fitted to the jig, said cover being bolted or otherwise fastened to the flanges 30. A gasket 33 is interposed between the cover and the flanges to ensure a proper airtight seal between the parts. The cover 32 has a small flat heating element 35 which is energized through circuit wires 36, the wires extending through the cover to a suitable power source. Mounted on the cover 32 so as to communicate with the interior of the jig 27 is a vertical pipe 37 which is connected to a vacuum pump, not shown. A branch pipe 38 is taken off the pipe 37, the branch pipe being fitted at its outer end with a needle valve 39. By selectively operating the needle valve air may be permitted to enter or escape from within the jig.

To evacuate and seal the envelope 10 it is enclosed within the jig 27 as shown in FIG. 2. In this position the closure 18 is disposed directly beneath the element 35 with the envelope parts being unconfined in any way by the jig. The jig and envelope assembly is then placed in an oven wherein the temperature can be maintained within close limits. Means are provided whereby the pipe 37 may be brought through the wall of the oven for connection to the vacuum pump. Means are also provided for operating the valve 39 from the oven exterior. The oven temperature is raised to a point between the annealing and softening temperature of the glass while the vacuum pump is operated to evacuate the entire assembly.

When evacuation of the assembly is complete the element 39 is turned on to heat the closure 18, and the area of the plate 14 immediately surrounding the closure, to a point above the softening point of the glass. This causes the legs 20 to lose their grip on the edge of the opening 17 whereupon the closure falls onto the top plate and unites therewith to completely seal the envelope. Once the sealing operation is finished the element 35 may be turned off and the temperature of the oven is then raised to heat the entire envelope to about the softening point of the glass.

When this softening temperature is reached the needle valve 39 is manipulated to gradually admit hot air to the interior of the jig. This has the effect of raising the pressure on the outside of the envelope so as to cause the softened glass to collapse until fully supported by the filler 24. After the pressure within the jig 27 has been allowed to reach atmospheric the entire assembly is allowed to cool slowly and thereafter the envelope 14 may be removed from the jig 27.

It will be noted that as evacuation takes place the pressure in the interior of the panel remains the same as the pressure on the panel exterior therefore there is no danger of the glass breaking during this crucial stage. Further the closure is sealed by a separate operation and only after sealing is the envelope shrunk by the controlled action of air pressure acting on the glass which is held at the correct temperature at all times. Thus the present method gives precise control over the entire operation so as to avoid panel breakage. Such wastage often occurs when conventional methods are employed and the panel is required to be heated to the glass softening point before any evacuation takes place.

The jig with its enclosed envelope has been described as being heated in an oven, but it will be obvious that other and perhaps more convenient methods of raising the temperature of the envelope may be used. For example, the jig, which may be of ceramic material or the like, could be fitted with one or more suitably located electrical heating elements so that the envelope temperature could be conveniently and economically controlled.

In evacuating these panels it is necessary to determine at what pressure the lowest conductivity is obtained. This pressure is dependent on the average spacing of the elements of porous material. It has been established that, in a porous material, the conductivity is lowest when the mean free path of the air molecules is equal to or greater than the average spacing of the elements of the structure. Reducing the pressure beyond that point will not materially improve conductivity. It therefore follows that the finer the structure the higher the pressure at which optimum conductivity is attained.

All porous materials are difficult to evacuate due to absorbed gases which are released only slowly even at very low pressures. The release of these gases however, is greatly accelerated by high temperatures. In a kinetic pumping system set up to evacuate a porous material, the gauge pressure will generally be lower than the actual pressure existing in the porous material except after very lengthy pumping. If the vacuum pump is disconnected the gauge will show a rise in pressure. This is due to the absorbed gases which will continue to be released for a considerable period after the pumping has ceased. Fortunately porous materials also exhibit a very strong tendency to reabsorb residual gases upon a reduction of temperature. Thus a heated kinetic evacuating system will show a rise in pressure if the pump is stopped, but if the system is now sealed off and the temperature allowed to drop the pressure will fall, often to a point much lower than was obtained with the pump in operation. In order to obtain the lowest conductivity in the sealed panel, the behaviour of gases at low pressure in porous materials must be well understood and the series of manufacturing operations must be planned to take full advantage of this behaviour. In general it may be said that evacuation should take place at the highest possible temperature and the final sealing operation should be carried out as close to that temperature as possible. The time required for the planning operation is dependent on many factors. Panel size and volume, type of filler, capacity and ultimate pressure of pump and temperature of operating will all influence the time required to attain the required final pressure and this time must be established experimentally for each set of conditions.

What I claim is:

A method of making a heat insulating panel formed of a thin glass wall envelope having an opening in one wall and a glass closure for the opening, which method consists of filling the envelope with a wall supporting gas containing porous filler, supporting the closure above the opening upon legs formed of glass enclosing the envelope in a jig, heating the assembly to a temperature below the softening point of the legs to degas the porous filler, evacuating the jig and the heated assembly, applying localized heat in the vicinity of the closure to a point above the softening point of the glass to melt the legs and seal the closure to the wall of the envelope, raising the temperature of the total assembly to about the softening point of the glass and slowly admitting heated air to the jig to cause the envelope to collapse until fully supported by the porous filler.

References Cited by the Examiner

UNITED STATES PATENTS

| | | | |
|---|---|---|---|
| 1,770,200 | 7/1930 | Comstock | 161—407 XR |
| 2,108,212 | 2/1938 | Schellens. | |
| 2,747,269 | 5/1956 | Atchison | 161—407 XR |
| 2,870,954 | 1/1959 | Kulesza. | |
| 2,988,852 | 1/1961 | Henry | 65—34 |
| 2,989,156 | 6/1961 | Brooks et al. | 161—407 XR |

JACOB H. STEINBERG, *Primary Examiner.*

EARL M. BERGERT, ALEXANDER WYMAN,
*Examiners.*